United States Patent [19]

Koschlig et al.

[11] Patent Number: 4,916,106
[45] Date of Patent: Apr. 10, 1990

[54] SUPPORTED CATALYST AND PROCESS FOR ITS PRODUCTION FOR THE REDUCTION OF NITROGEN OXIDES

[75] Inventors: Hans-Joachim Koschlig, Bochum-Dahlhausen; Frank Hutter, Würzburg; Helmut Schmidt, Zellingen, all of Fed. Rep. of Germany

[73] Assignee: Dr. C. Otto Feuerfest GmbH, Bochum-Dahlhausen, Fed. Rep. of Germany

[21] Appl. No.: 135,080

[22] Filed: Dec. 18, 1987

[30] Foreign Application Priority Data

Dec. 19, 1986 [DE] Fed. Rep. of Germany ....... 3643605

[51] Int. Cl.$^4$ .................. B01J 21/04; B01J 21/06; B01J 23/22; B01J 23/30
[52] U.S. Cl. .................. 502/309; 502/247; 423/239
[58] Field of Search .................. 502/247, 309; 423/213.2, 213.5, 239 A

[56] References Cited

U.S. PATENT DOCUMENTS

| 4,085,193 | 4/1978 | Nakajima et al. | 502/309 X |
| 4,221,768 | 9/1980 | Inoue et al. | 502/242 X |
| 4,378,338 | 3/1983 | Imanari et al. | 502/354 X |

FOREIGN PATENT DOCUMENTS 26-17744  11/1976  Fed. Rep. of Germany ...... 502/309

*Primary Examiner*—W. J. Shine
*Attorney, Agent, or Firm*—Oblon, Spivak, McClelland, Maier & Neustadt

[57] ABSTRACT

A supported catalyst suitable for nitrogen oxide reduction has an active catalyst coating containing metal oxides, which has been produced by a sol-gel process, on a solid porous supporting body.

8 Claims, No Drawings

SUPPORTED CATALYST AND PROCESS FOR ITS PRODUCTION FOR THE REDUCTION OF NITROGEN OXIDES

The invention relates to a supported catalyst for nitrogen oxide reduction, a process for its production and its use for the reduction of nitrogen oxides in combustion exhaust gases.

As a result of increasing environmental awareness, catalysts for the denitrification of exhaust gases of all kinds are becoming increasingly more important. At the present time, work is being done, in particular, on technological solutions for the removal of nitrogen oxides from the exhaust gases of large combustion plants such as, for example, power stations.

The process which has been developed furthest at the present time is the so-called SCR (Selective Catalytic Reduction) process in which a measured amount of ammonia is added to the stream of exhaust gas containing nitrogen oxide and is reacted with the nitrogen oxide to form nitrogen and water at suitable catalysts. In this connection, most of the processes available employ catalysts which are composed of titanium dioxide with admixtures of heavy metal oxides such as tungsten oxide or vanadium oxide; see, for example, German Auslegeschrift 2,458,888.

The disadvantages of these catalysts are that the mechanical and erosion properties of the ceramic base material are fairly unsatisfactory (shelf lives of 1 to 3 years), that relatively large amounts of expensive catalytically active materials are consumed and that, because of the high heavy metal contents, corresponding waste disposal problems are encountered.

Within the scope of extensive investigations on the development of improved denitrification catalysts which do not have, or have to a lesser extent, the said disadvantages, the inventors have considered the use of lower-cost porous ceramic supporting materials which are coated with catalytically active coatings which form only a fraction of the total mass of the supported catalyst. In this connection it was a requirement that the supporting materials had an adequate porosity and, correspondingly, a large specific surface available in order to ensure an adequate conversion. It then emerged first of all that simply impregnating ceramic supporting materials with salt solutions of the catalytically active components only resulted in very moderate results because the active components are transported back to the surface of the supported catalyst by the emerging moisture during the drying process. In this manner, an adequately large active surface cannot consequently be achieved.

Surprisingly, it has now been found that using the so-called sol-gel process, active catalyst coatings which themselves have a certain porosity and, consequently contribute to increasing the surface available for catalytic reactions, can be produced in the pores of a solid porous supporting material. Completely surprising was the fact that the active coatings produced in the porous supporting bodies by the sol-gel process have exceptional catalytic activity although they are essentially amorphous. Hitherto the catalytic activity of metal oxide catalysts such as are described, for example, in German Auslegeschrift 2,458,888, were associated with the presence of certain crystalline phases ($TiO_2$ as anatase, crystalline $WO_3$ etc.) in the catalyst composition.

The subject of the invention is, consequently, a supported catalyst for nitrogen oxide reduction which has, on and in a solid porous supporting body, an active catalyst coating containing metal oxide which is produced by a sol-gel process.

The subject of the invention is furthermore a process for producing said supported catalyst, wherein
(a) a solution of soluble and hydrolyzable compounds
  (A) of at least one element from the group comprising Al, Si and Ti;
  (B) of at least one element from the group comprising V, Mn, Fe, Co and Ni;
  (C) of at least one element from the group comprising Cr, Mo, W and Sn;
  (D) of optionally at least one element from the group comprising Mg, Cu, Zn, La, Ce and Gd;
  the proportion of said components, expressed as an atomic percentage of the elements, being 50 to 98 percent of (A), 1 to 50 percent of (B), 0.5 to 20 percent of (C) and 0 to 5 percent of (D) and the total of the atomic percentages being 100%,
  is reacted in an organic solvent with a lesser quantity of water than the quantity stoichiometrically necessary for the complete hydrolysis of the compounds, optionally in the presence of an acidic or basic catalyst;
(b) the precondensate produced is optionally further condensed with the quantity of water necessary for the hydrolysis of the residual hydrolyzable components, optionally in the presence of an acidic or basic catalyst;
(c) a solid porous catalyst supporting body is coated with the solution of the precondensate from stage (a) or of the further condensed product from stage (b), a further condensation of the precondensate in the first mentioned case being performed on the coated supporting body; and
(d) the coated supporting body is dried and heat-treated.

Finally, the subject of the invention is the use of said supported catalyst for the reduction of nitrogen oxides, in particular for the denitrification of combustion exhaust gases.

Suitable carriers for the supported catalyst according to the invention are, in particular, porous ceramic supporting materials, for example of cordierite, mullite, stoneware, aluminum oxide and/or aluminum titanates. Particularly preferred are the supporting bodies, described in German OS 3,632,321 and 3,632,322, consisting of a fired ceramic body of honeycomb structure with a free (open) cross-sectional area of at least 80%. The ceramic body has as low a natural porosity as possible but contains secondary pores which have been formed by one or more so-called opening materials. The purpose of the secondary pores is to increase the surface and to create a volume which is directly accessible from the longitudinal channels with through-flow and in which the catalytically active coating can be deposited. The pores due to the natural porosity have a diameter of usually 10 to 3000 nm, whereas the pore diameter of the secondary pores is in the region of 4000 to 60,000 nm. The total porosity of the body consisting of primary and secondary porosity of the cell walls is preferably 30 to 70%. Optionally, mineral fibers may be added to the raw ceramic mixture for the supporting body to confer an increased rigidity on the extruded supporting body after molding. For this purpose, for example, fibers of glass, rockwool, mullite or aluminum oxide are suitable.

To produce the active catalyst coating, the starting components (A), (B), (C) and optionally (D) are employed in the form of hydrolyzable (i.e. decomposable to oxide or hydroxide with water) compounds which are soluble in organic solvents. For this purpose suitable compounds are, for example, halides (for example, chlorides), nitrates, sulfates, carboxylates (for example, acetates), acetyl acetonates and alcoholates (for example, methylates, ethylates, isopropylates and n-butylates).

Suitable solvents are nonaqueous organic solvents, for example alcohols such as methanol, ethanol, n-propanol, isopropanol or n-butanol, ethers such as dimethoxyethane, esters such as dimethyl glycol acetate, and ketones such as acetone or methyl ethyl ketone.

To prepare the precondensate, the starting components are reacted in the desired mixture ratio with a lesser quantity of water than the quantity stoichiometrically necessary for the complete hydrolysis of the compounds.

Preferably, the precondensation is carried out in the presence of a catalyst. Suitable catalysts are compounds which detach protons or hydroxyl ions, and amines. Special examples of catalysts which can be used are organic and inorganic acids such as hydrochloric acid, sulfuric acid, phosphoric acid, formic acid, or acetic acid, and also organic or inorganic bases such as ammonia, alkali-metal or alkaline-earth-metal hydroxides, for example sodium, potassium or calcium hydroxide, and amines which are soluble in the reaction medium, for example lower alkyl amines or alkanol amines. In this connection, volatile acids and bases, in particular hydrochloric acid, ammonia and triethylamine, are particularly preferred. The total catalyst concentration may be, for example, up to 3 mol/l. The precondensation is performed in the usual manner at temperatures from room temperature up to the boiling point of the organic solvent used, preferably at room temperature.

The precondensation is allowed to proceed to the extent that the precondensate solution produced has still a thin-bodied consistency.

The precondensate solution obtained can be applied as such to the catalyst supporting body, after which the hydrolysis and condensation process is taken to completion, for example in an atmosphere containing water vapor.

Alternatively the hydrolysis and condensation process is continued immediately in the precondensate solution by adding at least the amount of water necessary for the hydrolysis of the residual hydrolyzable components, generally, however, a superstoichiometric quantity of water.

The further condensation is optionally carried out in the presence of one of the abovementioned catalysts. The total catalyst concentration may be, for example, up to 5 mol/l.

The further condensation is performed at temperatures from room temperature to the boiling point of the solvent used and, in particular, until a viscosity of the solution is obtained which still permits application to the catalyst supporting body.

The coating of the supporting body can be carried out with the precondensate solution or the furthercondensate solution by conventional methods, for example by immersion, impregnation or spraying. The coating can be performed at atmospheric pressure, reduced pressure or excess pressure in air or under inert gas.

The coated supporting body is then dried in order to volatilize the solvent, preferably for 1 to 24 hours at 50° to 200° C. The dried supported catalyst is then heat-treated, preferably for 1 to 24 hours at a temperature of 200° to 500° C., in particular 300° C.

In the case of the supported catalyst obtained in this manner, the loading of the supporting body with active catalyst coating is preferably 0.1 to 30 percent by weight, in particular 10 to 20 percent by weight, referred to the uncoated supporting body. The active coating is x-ray amorphous and has a specific surface of usually 50 to 500 m$^2$/g, preferably 150 to 350 m$^2$/g.

The supported catalyst according to the invention can be used for the catalytic reduction of nitrogen oxides and, in particular, for the denitrification of combustion exhaust gases. The gas mixtures treated contain in general nitrogen, oxygen, carbon monoxide, carbon dioxide, nitrogen oxides and possibly sulfur dioxide. The nitrogen oxides to be converted into harmless gases such as, for example nitrogen, include, for example NO, $N_2O_3$, $NO_2$, $N_2O_4$ and $N_2O_5$.

The reduction of the nitrogen oxides is carried out preferably in the presence of ammonia, the quantity of which depends on the content of nitrogen oxides in the gas mixture treated. Usually, 0.5 to 5 mol of ammonia are employed per 1 mol of nitrogen oxide.

The presence of oxygen favors the reduction of nitrogen monoxide (NO) in the presence of ammonia. In the case of nitrogen oxides higher than NO, the presence of oxygen not absolutely necessary.

Nitrogen oxide reduction can be performed at temperatures of, for example, 100° to 450° C. at atmospheric pressure of excess pressure.

The supported catalyst according to the invention has, inter alia, the following advantages over conventional solid catalysts and supported catalysts:

1. The supporting body is a highly porous, wear-resistant ceramic with low specific gravity (approx. 400 kg/m$^3$) and high free cross sections (at least 80%), as a result of which a low flow resistance with energy savings associated therewith is achieved in the gas transport.

2. Because it is applied in the dissolved state, the main quantity of the catalytically active substance is embedded in the pores of the carrier, whereas in the case of known metal oxide supported catalysts, only a superficial coating with a metal oxide dispersion takes place.

3. In contrast to pure surface coatings, the catalytically active substance deposited in the carrier is protected against mechanical wear.

4. A high catalytic action is produced with small amounts of catalyst substance.

5. Only small absolute amounts of catalytically active substance are introduced onto and into the carrier so that the heavy metal consumption is also extremely small.

6. Because of the low heavy metal content in the carrier, the entire catalyst body can be recycled and used in the production of new carriers.

7. As a consequence of the stable ceramic supporting body, unworn catalyst bodies can be cleaned and recoated.

8. As a result of the high wear-resistance of the supported catalyst, only small amounts of pollutant dusts, which could pollute the environment, are produced.

The following example explains the invention.

EXAMPLE 1

Production of the supported catalyst 42.6 g of Ti(OC$_2$H$_5$)$_4$ (60 atomic percent Ti), 28.4 g of VO(OC$_4$H$_9$)$_3$ (31.6 atomic percent V) and 10.4 g of WCl$_6$ (8.4 atomic percent W) are dissolved in 250 ml of methanol, after which 1.35 ml of 0.01M aqueous hydrochloric acid are added and the solution is stirred for 2 hours at room temperature. The quantity of water added is equivalent to 1/16 of the quantity of water stoichiometrically necessary for the complete hydrolysis of the components.

A honeycomb body of cordierite (approx. 35 cm$^3$) previously wetted with methanol is immersed for 1 hour in the solution obtained above, then removed and stored at room temperature in an atmosphere of 30 to 50% relative humidity. The supported catalyst obtained is then dried for 16 hours at 120° C. and subsequently heat-treated for 5 hours at 300° C. Denitrification of combustion exhaust gases.

The coated honeycomb body is introduced into an electrically heatable flow reactor into which gas mixtures made up from the following pure gases are fed: nirogen, oxygen, nitrogen monoxide, ammonia, sulfur dioxide. To do this, the pure gases are taken from steel pressure cylinders, measured amounts are introduced into a mixing section and fed to the catalyst via an upstream preheating zone.

The gas volume flow in proportion to the catalyst volume (space velocity) is 1500 h$^{-1}$. The measurements are performed at temperatures of 200° C. to 360° C. with or without measured amounts of oxygen being added.

The NO reduction (%) is determined on the basis of the gases entering or emerging from the reactor using analyzers (for example chemoluminescence, chemical sensors) or by wet chemical means. The results are stated in Table I below:

TABLE I

| T$_{cat}$ (°C.) | NO input (ppm) | O$_2$ content (%) | NH$_3$:NO | NO reduction (%) |
|---|---|---|---|---|
| 240 | 1000 | — | 0.65 | 38 |
| 240 | | — | 1 | 52.6 |
| 280 | | — | 0.65 | 51.5 |
| 280 | | — | 1 | 71 |
| 320 | | — | 0.65 | 48.1 |
| 320 | | — | 1 | 77.4 |
| 360 | | — | 0.65 | 51.8 |
| 360 | | — | 1 | 75.2 |
| 240 | 1000 | 3.1 | 0.65 | 53.7 |
| 240 | | 3.1 | 1 | 81.6 |
| 280 | | 3.2 | 0.65 | 52 |
| 280 | | 3.2 | 1 | 89.5 |
| 320 | | 2.9 | 0.65 | 49 |
| 320 | | 3 | 1 | 87.7 |
| 360 | | 3.1 | 0.65 | 52.3 |
| 360 | | 3.1 | 1 | 80. |

EXAMPLES 2 TO 4

Composition of the catalytically active component consisting of the oxides of Ti, W and V

| Example | Composition (atom-%) Ti | W | V | Ti(OC$_2$H$_5$)$_4$ (g) | WCl$_6$ (g) | VO(OC$_4$H$_9$)$_3$ (g) | 0.01 m HCl (ml) |
|---|---|---|---|---|---|---|---|
| 2 | 72 | 8.4 | 19.6 | 51.1 | 10.4 | 17.6 | 22.6 |
| 3 | 76 | 20 | 4.0 | 54.0 | 24.8 | 3.6 | 24.9 |
| 4 | 83 | 8.4 | 8.6 | 58.9 | 10.4 | 7.7 | 23.3 |

Ti(OC$_2$H$_5$)$_4$, VO(OC$_4$H$_9$)$_3$ and WCl$_6$ are dissolved in 250 ml of methanol. 1/16 of the specified volume of 0.01M HCl are added and stirring is carried out for 2 h at room temperature. The quantity of water added is equivalent to 1/16 of the quantity stoichiometrically necessary for the complete hydrolysis of the starting compounds.

To coat a cordierite honeycomb body, the remaining quantity of HCl is added to the coating solution, after which the mixture is diluted with 750 ml of methanol and stirred for 30 minutes. The solution obtained is employed for the immersion coating of the carrier. An intermediate storage in a moist atmosphere at room temperature can be omitted. In order to achieve an adequate loading of the carrier with catalyst, the immersion process is optionally repeated several times after a short (2 h) intermediate drying at 120° C. (check by weighing). The temperature conditions correspond to those of Example 1.

The measurement of the catalytic activity is carried out under the conditions of Example 1.

The measurement data stated in Table II are obtained for the carrier coated with 8.9% by weight of the catalytic composition from Example 2.

TABLE II

| T$_{cat}$ (°C.) | NO input ppm | O$_2$ content (%) | NH$_3$:NO | NO reduction (%) |
|---|---|---|---|---|
| 160 | 1000 | 3 | | 33.6 |
| 200 | | | | 49.1 |
| 240 | | | | 65.6 |
| 280 | | | | 86.8 |
| 320 | | | | 91.5 |
| 320 | | | 0.96 | 92.5 |
| 360 | | | 0.66 | 91.5 |
| 400 | | | | 96.2 |

The measurement data stated in Table III are determined for the carrier coated with 7.3% by weight of the catalytic composition from Example 3.

TABLE III

| T$_{cat}$ (°C.) | NO input ppm | O$_2$ content (%) | NH$_3$:NO | NO reduction (%) |
|---|---|---|---|---|
| 160 | 600 | 0 | 0.66 | 32.5 |
| 180 | | | | 44.7 |
| 240 | | | | 56.1 |
| 280 | | | | 68.4 |
| 320 | | | | 75.4 |
| 360 | | | | 78.9 |
| 400 | | | | 78.9 |
| 450 | | | | 82.5 |

The measurement data stated in Table IV are determined for the carrier coated with 14.4% by weight of the catalytic composition from Example IV.

TABLE IV

| T$_{cat}$ (°C.) | NC input (ppm) | O$_2$ content (%) | NH$_3$:NO | NO reduction (%) |
|---|---|---|---|---|
| 120 | 980 | 3 | 0.89 | 26.5 |
| 180 | | | | 58.2 |
| 260 | | | | 85.4 |

TABLE IV-continued

| $T_{cat}$ (°C.) | NC input (ppm) | $O_2$ content (%) | $NH_3:NO$ | NO reduction (%) |
|---|---|---|---|---|
| 320 | 950 | | 0.92 | 90.0 |
| 320 | | | 1.01 | 92.6 |
| 320 | 980 | | 0.98 | 92.9 |
| 320 | 990 | | 0.97 | 93.9 |
| 360 | | | | 94.2 |
| 400 | | | | 94.2 |

An industrial pilot trial was also performed with this supported catalyst:
Catalyst volume: 11.4 l
Space velocity: 3000 h$^{-1}$
Natural gas firing with an NO injection of 800 ppm
Catalyst temperature: 330° C.
Oxygen content: 6.2% by volume
$NH_3/NO$ ratio = 1.

EXAMPLE 5

Composition of the catalytically active component composed of the oxides of Ti, Cr and V Production of a supported catalyst with a catalytic component of the composition (in atomic %): 83 Ti; 8.4 Cr; 8.6 V 200 g of Ti(OC$_2$H$_5$)$_4$ (83 atomic % Ti) and 24.6 g of VO(OC$_4$H$_9$)$_3$ (8.6 atomic % V) are mixed. The mixture is boiled with 13 g of CrCl$_3$ (8.4 atomic % Cr) under reflux for 2 h, then all the CrCl$_3$ is dissolved. 1000 ml of methanol are added. The resulting dark solution is employed as coating solution. The coating of a cordierite honeycomb body is carried out by the process described in Example 1: intermediate treatment 2 h at 20° C. and 65% relative humidity, intermediate drying 30 min at 120°C.; the coating process is repeated five times. After the subsequent tempering for 5 h at 400° C., the amount of catalytic material deposited on the carrier is 14.5% by weight.

The measurement of the catalytic activity is carried out as in Example 1. In this case, the measurement data stated in Table V are determined.

TABLE V

| $T_{cat}$ (°C.) | NO input (ppm) | $O_2$ content (%) | $NH_3:NO$ | NO reduction (%) |
|---|---|---|---|---|
| 160 | 1000 | 0 | 0.66 | 5.2 |
| 200 | | | | 17.7 |
| 240 | | | | 28.1 |
| 320 | | | | 58.3 |
| 360 | | | | 68.8 |
| 400 | | | | 82.3 |

EXAMPLE 6

Composition of the catalytically active component composed of the oxides of Ti, Mo and V Production of a supported catalyst with a catalytic component of the composition (in atomic %): 83 Ti; 8.4 Mo; 8.6 V.

189 g of Ti(OC$_2$H$_5$)$_4$ (83 atomic % Ti) and 24.4 g of VO(OC$_4$H$_9$)$_3$ (8.6 atomic % V) are mixed and cooled in an ice bath. 22.9 g of MoCl$_5$ (8.4 atomic % Mo) are dissolved in the latter and the mixture is diluted with 1000 ml of methanol. After adding 3.7 ml of water, stirring is carried out for 80 min, then a further 56.3 ml of water are added while stirring. A brown viscous solution, which is employed as coating solution, results.

The coating of a cordierite honeycomb body is carried out as in Examples 2 to 4. After coating five times and tempering (5 h, 400° C.), the carrier has absorbed 15% by weight of catalytic material.

The measurement of the catalytic activity is carried out as in Example 1. In this case the measurement data stated in Table VI are determined.

TABLE VI

| $T_{cat}$ (°C.) | NO input (ppm) | $O_2$ content (%) | $NH_3:NO$ | NO reduction (%) |
|---|---|---|---|---|
| 120 | 1000 | 0 | 0.7 | 21.5 |
| 160 | | | | 42.1 |
| 200 | | | | 56.1 |
| 240 | | | | 77.8 |
| 280 | | | | 86.9 |
| 320 | | | | 90.0 |
| 360 | | | | 92.9 |
| 400 | | | | 94.0 |

EXAMPLE 7

Composition of the catalytically active component composed of the oxides of Si, W and V Production of a supported catalyst with a catalytic component of the composition (in atomic %): 83 Si; 8.4 W; 8.6 V.

130 g of tetraethoxysilane Si(OC$_2$H$_5$)$_4$ (83 atomic % Si) and 19.5 g of VO(OC$_4$H$_9$)$_3$ (8.6 atomic % V) are mixed. 28.4 g of WCl$_6$ (8.4 atomic % W) are dissolved in the latter and the mixture is diluted with 1500 ml of ethanol.

After adding 3.5 ml of water, stirring is carried out for 60 min, then a further 52 ml of water are added while stirring. The resulting yellowish brown solution is employed as coating solution.

The coating of a cordierite honeycomb body is carried out as in Examples 2 to 4. After coating ten times and tempering (5 h/400° C.), the carrier has absorbed 15% by weight of catalytic material.

The measurement of the catalytic activity is carried out as in Example 1. In this case the measurement data stated in Table VII are determined.

TABLE VII

| $T_{cat}$ (°C.) | NO input (ppm) | $O_2$ content (%) | $NH_3:NO$ | NO reduction (%) |
|---|---|---|---|---|
| 120 | 950 | 0 | 0.7 | 5.2 |
| 120 | 950 | 2.9 | 0.7 | 11.8 |
| 240 | 950 | 0 | 0.7 | 21.3 |
| 240 | 950 | 2.8 | 0.7 | 66.5 |
| 240 | 950 | 2.9 | 1.0 | 87.2 |
| 360 | 950 | 2.9 | 0.7 | 63.8 |
| 360 | 950 | 2.8 | 1.0 | 88.4 |

We claim:

1. A supported catalyst for nitrogen oxide reduction, comprising a solid porous supporting body on which an essentially amorphous active catalyst coating containing metal oxides is deposited, wherein the active catalyst coating is obtained by a sol-gel process which comprises reacting:
   (a) a solution of soluble and hydrolyzable compounds:
      (A) of one element selected from the group consisting of Al, Si and Ti;
      (B) of at least one element selected from the group consisting of V, Mn, Fe, Co and Ni;
      (C) of at least one element selected from the group consisting of Cr, Mo, W and Sn; and (D) of optionally at least one element selected from the group consisting of Mg, Cu, Zn, La, Ce and Gd;
  wherein the proportion of said elements, expressed as an atomic percentage of the elements, is 50–98% of (A), 1–50% of (B), 0.5–20% of (C), and 0–5% of (D), and the total of the atomic percentages is 100%,
  in an organic solvent with a lesser quantity of water than the quantity stoichiometrically necessary for the complete hydrolysis of the compounds, optionally in the presence of an acidic or basic catalyst;
(b) optionally further condensing the precondensate produced with a quantity of water necessary for the hydrolysis of the residual hydrolyzable components, optionally in the presence of an acidic or basic catalyst;
(c) coating the solid, porous catalyst supporting body with the solution of the precondensate from step (a) or the further condensed product from step (b), further condensation o the precondensates in said first mentioned case being performed on the coated supporting body; and
(d) drying and heating the coated carrier body.

2. The supported catalyst as claimed in claim 1, wherein the active catalyst coating is composed of oxides of Ti, V and W.

3. The supported catalyst as claimed in claim 1, wherein the porous supporting body is a fired ceramic body of honeycomb structure with a free cross-sectional area of at least 80%.

4. The supported catalyst as claimed in claim 3, wherein the ceramic body is composed of a material selected from the group consisting of cordierite, mullite, stoneware and aluminum oxide.

5. The supported catalyst as claimed in claim 1,
  wherein the loading of the supporting body with active catalyst coating is 0.1 to 30 percent by weight, referred to the uncoated supporting body.

6. The supported catalyst as claimed in claim 1, wherein the active catalyst coating has a specific surface of 50 to 500 m$^2$/g.

7. A process for the production of the supported catalyst as claimed in claim 1, which comprises reacting:
(a) a solution of soluble and hydrolyzable compounds
    (A) of one element from the group comprising Al, Si, and Ti;
    (B) of at least one element from the group comprising V, Mn, Fe, Co and Ni;
    (C) of at least one element from the group comprising Cr, Mo, W and Sn; and
    (D) of optionally at least one element from the group comprising Mg, Cu, Zn, La, Ce and Gd;
  the proportion of said components, expressed as an atomic percentage of the elements, being 50 to 98 percent of (A), 1 to 50 percent of (B), 0.5 to 20 percent of (C) and 0 to 5 percent of (D) and the total of the atomic percentages being 100%, in an organic solvent with a lesser quantity of water than the quantity stoichiometrically necessary for the complete hydrolysis of the compounds, optionally in the presence of an acidic or basic catalyst;
(b) optionally further condensing the precondensate produced with the quantity of water necessary for the hydrolysis of the residual hydrolyzable components, optionally in the presence of an acidic or basic catalyst;
(c) coating the solid porous catalyst supporting body with the solution of the precondensate from step (a) or of the further condensed product from step (b), said further condensation of the precondensate in the first-mentioned case being performed on the coated supporting body; and drying and heating the coated carrier body.

8. The process as claimed in claim 7, wherein the heat treatment of the coated supporting body is performed at 200° to 500° C.

* * * * *